Patented July 12, 1932

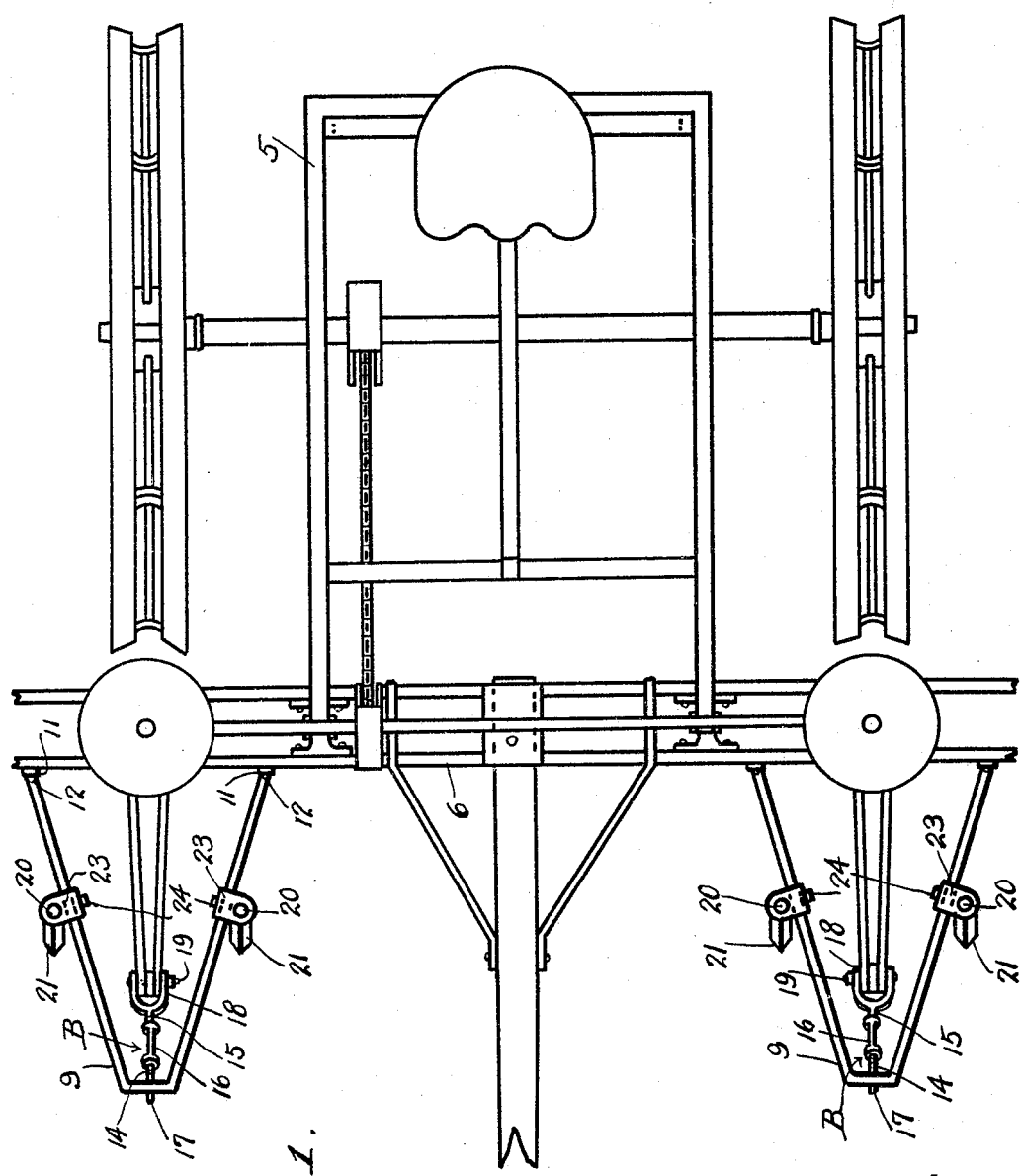

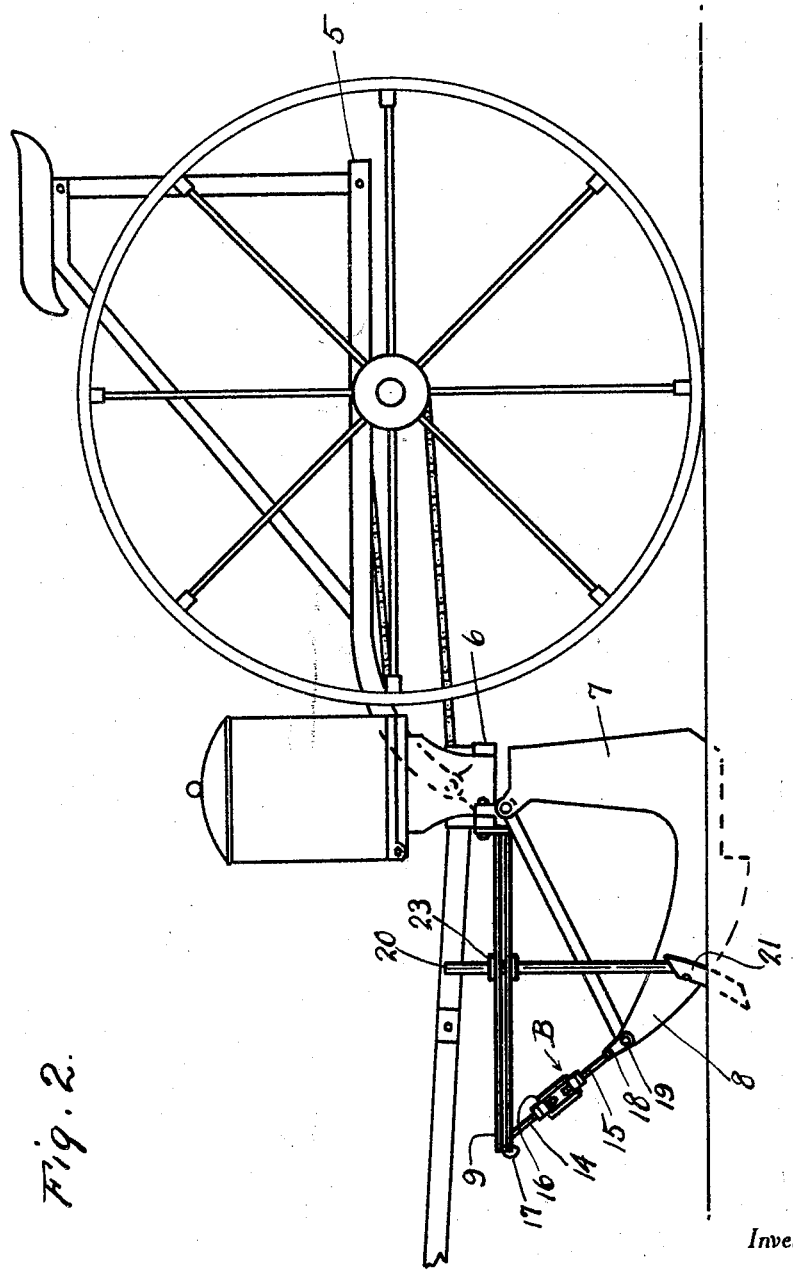

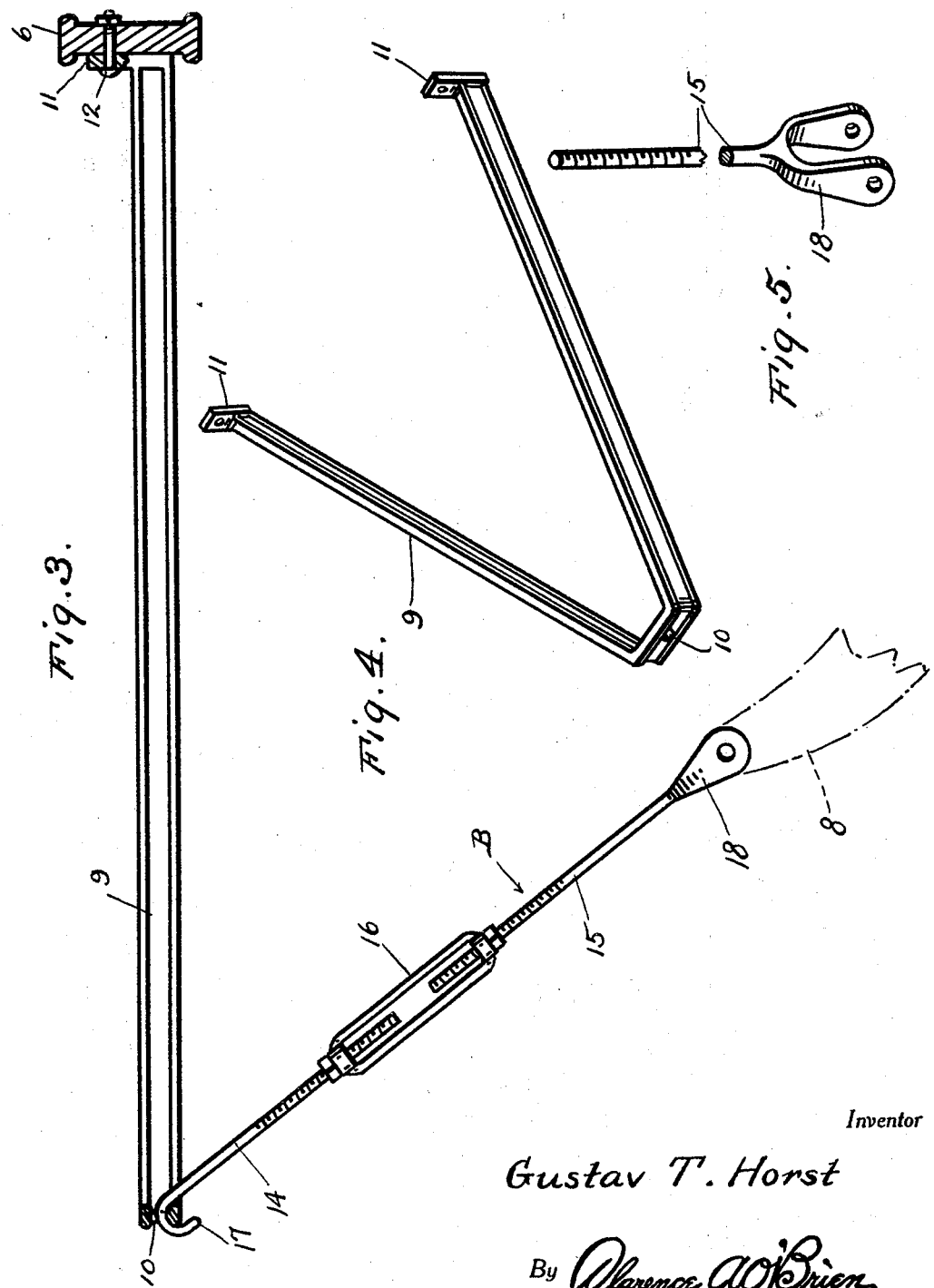

1,867,075

UNITED STATES PATENT OFFICE

GUSTAV T. HORST, OF MISSION, SOUTH DAKOTA

CORN PLANTER ATTACHMENT

Application filed September 8, 1931. Serial No. 561,798.

The present invention relates to an attachment for a corn planter and has for its prime object to provide an attachment in the form of a bracket-brace to support the forward end of a planter unit.

Another very important object of the invention resides in the provision of an attachment of this nature which is simple in its construction, inexpensive to manufacture, easy to install, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter described.

In the drawings:

Figure 1 is a top plan view of a corn planter showing a pair of my attachments mounted thereon.

Figure 2 is a side elevation thereof.

Figure 3 is a longitudinal sectional view through one of the attachments.

Figure 4 is a perspective view of one of the brackets, and

Figure 5 is a perspective view of one section of one of the braces.

Referring to the drawings in detail it will be seen that the numeral 5 denotes generally a conventional corn planter and the numeral 6 the front bar thereof. Numerals 7 denote the usual boots and numerals 8 the guides which project forwardly from the lower end thereof. Numerals 9 denote V-shaped brackets having openings 10 in their apexes and on their ends being formed with ears 11. The ears 11 are bolted as at 12 to the top bar 6. Letters B denote generally supporting members. Each member comprises a pair of sections 14 and 15 connected adjustably together by means of a turnbuckle 16. On the extremity of the section 14 there is a hook 17 to engage in the opening 10 while on the extremity of the section 15 there is a yoke 18 to be engaged by a bolt or the like 19 with the forward end of a guide 8. Mounted on each bracket is a pair of vertical standards 20 with suitable cultivating tools or implements 21 mounted on their lower ends. Each standard 20 is connected to a side of a bracket 9 by means of a U-shaped clamp 23 straddling the side of the bracket and the standard extending through the ends thereof and a set screw 24 threaded through the bight thereof to engage on the side of the bracket.

With attachments mounted on the planter it will be seen that the guides 8 are sufficiently braced to open up furrows when the planter is moved forwardly and the implement 21 will cultivate alongside of the furrow as it is being opened up.

It is thought that the construction, utility and advantages of this invention will now be quite apparent to those skilled in this art without a more detailed description.

The present embodiment of the invention has been described in considerable detail merely for the purposes of exemplification since in actual practice it attains the features of advantage enumerated as desirable in the statement of the invention and the above description.

It will be apparent that changes in the details of construction and the combination and arrangement of parts may be resorted to without departing from the spirit or scope of the invention as hereinafter claimed or sacrificing any of its advantages.

Having thus described my invention, what I claim as new is:

1. In combination with a planter including a front cross bar, a boot having forwardly directed guides at its bottom, a V-shaped bracket having its ends fixed to the cross bar to extend forwardly and horizontally therefrom, and a brace engaged in the apex of the bracket and on the forward end of the guide.

2. In combination with a planter including a front cross bar, a boot having forwardly directed guides at its bottom, a V-shaped bracket having its ends fixed to the cross bar to extend forwardly and horizontally therefrom, and a brace engaged in the apex of the bracket and on the forward end of the guide, the apex of the bracket being formed with an opening and the brace having one end formed with a hook to engage in said opening.

3. In combination with a planter including a front cross bar, a boot having forwardly directed guides at its bottom, a V-shaped bracket having its ends fixed to the cross bar to extend forwardly and horizontally therefrom, and a brace engaged in the apex of the bracket and on the forward end of the guide, the apex of the bracket being formed with an opening and the brace having one end formed with a hook to engage in said opening, said brace being adjustable by having two sections connected by a turn buckle.

4. In combination with a planter including a front cross bar, a boot having forwardly directed guides at its bottom, a V-shaped bracket having its ends fixed to the cross bar to extend forwardly and horizontally therefrom, a brace engaged in the apex of the bracket and on the forward end of the guide, the apex of the bracket being formed with an opening and the brace having one end formed with a hook to engage in said opening, said brace being adjustable by having two sections connected by a turn buckle, vertical standards with implements on their lower ends, and means for clamping the standards in the sides of the bracket.

In testimony whereof I affix my signature.

GUSTAV T. HORST.